Sept. 10, 1968  H. B. TEMPLE  3,400,483

FISHHOOK BAIT HOLDER

Filed March 7, 1966

HENRY B. TEMPLE
*INVENTOR.*

BY

*H. C. Hogencamp*
AGENT

United States Patent Office 3,400,483
Patented Sept. 10, 1968

3,400,483
FISHHOOK BAIT HOLDER
Henry B. Temple, Rte. 1, Woodland, Ga. 31836
Filed Mar. 7, 1966, Ser. No. 532,369
4 Claims. (Cl. 43—44.6)

ABSTRACT OF THE DISCLOSURE

A fishhook with a pressure-exerting bait holding device attached to the upper shank portion. The pressure exerting section of the holding device extends outwardly of the shank portion and terminates in a bar-clamp portion which is substantially parallel to the fishhook shank, the lower end of the bar-clamp portion following the curvature of the fishhook curved portion. The pressure exerting section and the bar-clamp portion are interconnected by an intermediate wire portion which extends across and generally at right angles to the fishhook shank.

---

The present invention relates to an improved form of fishhook bait holder used for attaching live bait to a fishhook.

The principal object of the invention is to provide an improved fishing device which includes a fishhook or hooks combined with an attachment for holding live bait with a minimum of harm to the bait.

Other objects are to provide such a device in forms which are simple in construction and operation, low in cost and easily manufactured.

Still further objects will become apparent from the following description together with the drawing and the appended claims.

Numerous types of bait-clamping devices are known in the prior art, each unquestionably having advantages and disadvantages and often being specifically useful for holding certain types of live bait. In other words specialization has crept into the field. In an attempt to lure the fish, changes and improvements are constantly being sought after. In addition, simplicity and ease of operation are much desired, especially by the amateur or sport fisherman.

One bait-clamping device is shown in U.S. Patent No. 2,962,932 while another type of clamping device is shown in my co-pending application, Ser. No. 521,457. Neither of these devices are suitable for holding certain types of bait, such as angle-worms.

The device herein disclosed is particularly adaptable for holding worms with a minimum of physical harm and with some modification, is equally useful for holding rigid-bodied bait such as shrimp, grasshoppers and the like, as compared to flexible-bodied bait such as minnows.

A better understanding of my invention will be had from the following description with reference being made to the accompanying drawing in which.

Referring in more detail to the drawing in which like numerals indicate like parts.

Figure 1:
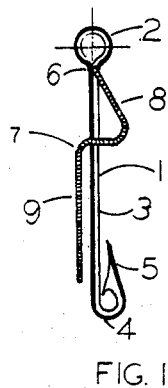
FIG. 1 and FIG. 2 show two views of a most simplified basic form of construction of the invention.
Figure 2:
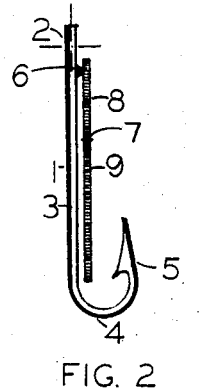

In FIG. 1 and FIG. 2 a fishhook 1 of normal construction is shown, with eye 2 for attaching a fish line, a straight shank 3 terminating in a curved portion 4 having a barb 5 at the end. Fixably attached to fishhook 1 as by welding or otherwise at point 6 is a bait-holding attachment 7 comprised of an upper pressure-exerting spring loop section 9 shaped substantially as shown, and a lower bar-clamp portion 9 which might be straight or might bulge slightly outward in the central part but in either case is positioned substantially parallel with but slightly spaced from the straight shank or stem 3 of the fishhook.

The fishhook 1 of these figures is of the ordinary type and is most often fabricated from a rigid steel wire. The bait-holding attachment 7 in this form of construction can be of the same material as the fishhook but is preferably shaped from a more flexible wire or material and most preferably should have a serrated outer surface at least on the side of the straight portion nearest to the shank of the fishhook. It might advantageously be formed from a spirally-wound spring wire as indicated in these figures thus effectively providing a serrated outer surface.

Figure 3:
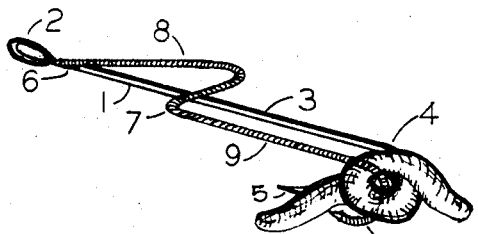
FIG. 3 is a preferred modified construction of the form shown in FIG. 1 and FIG. 2 and shows the device as used to hold live bait.

The construction shown in FIG. 3 is identical to that of FIG. 1 and FIG. 2 except that a curved portion 10 which generally follows the curvature 4 of the fishhook 1 extends from the bottom of the straight bar-clamp portion 9 of the bait-holding attachment. It is to be noted that in the construction of FIG. 1, FIG. 2 and FIG. 3 the curved-barbed section of the fishhook 1 angles outwardly from the shank section 3, curving upwardly, but the upward curve is not parallel with the shank. This is considered the standardized form of construction of fishhooks and is considered of importance to this invention. Viewing the construction from the angle shown in FIG. 1 it will be seen that the bait-holding attachment is shaped so that the bar-clamp portion 9 is positioned on the opposite side of shank or stem 3 of the fish hook from the main operative part of the pressure-exerting loop 8 which crosses over shank 3 and, from this view, bar-clamp 9 appears on the opposite or a different side of shank 3 from the direction or angle at which curved portion 4 extends from the shank 3. Also, as previously stated, the straight bar-clamp 9 of the bait-holding attachment, in its normal position, is spaced from shank 3 of fishhook 1.

FIG. 3 shows the device of this invention in a preferred modified form as it is used for holding an angleworm or as commonly designated a fishworm. In this figure the bait-holding attachment is curved upwardly at its lower end as indicated by 10 to further aid in preventing the live bait or worm from squirming off but otherwise is similar to the construction of FIG. 1–FIG. 2 in operation and to put on or attach the worm, the pressure-exerting loop 8 of the bait-holding attachment is pressed inwardly toward the shank 3 of the fishhook. This causes the already-spaced bar-clamp 9 to assume a position further spaced outwardly from shank 3 of the fishhook and on a different side of shank 3 from the barb 5, thus aiding in removing the safety hazard of hooking one's self upon the barb while the bait is being attached. With bar-clamp 9 furthest removed from shank 3, the worm can very easily be "wrapped around" portion 9. When pressure is removed from loop 8 the worm will be firmly held between bar-clamp 9 and shank 3 as generally shown in this figure. Since bar-clamp 9 and shank 3 are spaced in their normal positions due to the construction of this device and the bait-holding attachment is made of flexible material the worm will not be cut by undue pressure between the bait-holding attachment and the fishhook as would be the case if the bait-holding attachment and the fishhook pressed tightly against each other and the bail-holding attachment was formed of rigid material. However, by reason of the serrated outer surface and the curved end of the bait-holding attachment, the worm will not easily be able to squirm off even though it is desirably positioned near the lower end close to but not obstructing the barb of the fishhook itself. Although this construction is especially useful for holding worms it is obvious that other types of live bait can also be firmly held in this device.

Figures 4, 5:
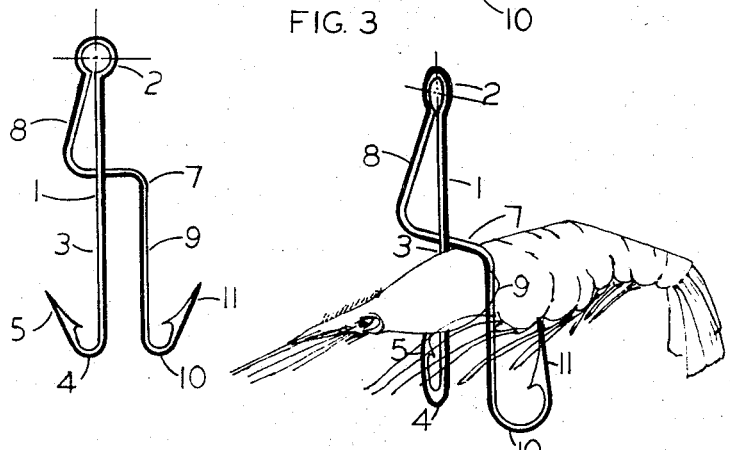
FIG. 4 is a further modification of the construction of FIG. 1.
FIG. 5 depicts the construction of FIG. 4 as used to hold live bait.

The modified form of construction shown in FIG. 4 is more particularly useful for holding rigid-bodied bait and FIG. 5 shows the construction of FIG. 4 with a fresh water shrimp held thereby.

In the construction of FIG. 4 the entire device might be shaped and formed from a single piece of wire material of the type commonly used in the formation of fishhooks as shown or of course could consist of separately formed portions welded together in a manner such as shown in the previous figures.

In this figure, as in the other figures, the basic fishhook 1 consists of eye 2, shank 3, and curved portion 4 having a barb 5 at its end. The bait-holding attachment 7 as shown in FIG. 4 is integral of and a continuation of the material of the fishhook bent downwardly and continuing from eye 2. The pressure-exerting loop 8 is similar in form and positioning to that of the previous figures as is the spaced bar-clamp 9 and the curved portion 10 is as shown previously in FIG. 3. However, in FIG. 4 and FIG. 5 the curved portion 10 of the bait-holding attachment 7 does not follow the contour of the curved portion 4 of the fishhook 1 as is the case in FIG. 3 but is curved outwardly from the parallel portions of the device in a different direction from curved portion 4 of the basic fishhook 1. In this construction the curved portion 10 ends in a barb 11 and therefore effectively forms a second fishhook. Preferably the two curved and barbed sections of the hooks extend outwardly from the stem sections so as to be positioned substantially normal to each other.

To attach the live bait, shown in FIG. 5 as a fresh water shrimp, it is a simple matter to press the pressure-exerting loop 8 inwardly toward shank 3 of the original fishhook section 1, thus opening the spacing between bar-clamp 9 and shank 3 to a maximum and the bait is slipped into this spacing, being firmly held between bar-clamp 9 and shank 3 as shown in this figure when pressure is released from loop 8. It will be noted that both fishhook curved ends and barbs, 2–5 and 10–11 respectively, point outwardly from the substantially parallel shank 3 and bar-clamp 9 and thus afford an open passage between shank 3 and bar-clamp 9 for the insertion and holding of the live bait and that both hook barbs remain open and unobstructed even after the bait is attached. This is clearly shown in FIG. 1 and serves two purposes. It minimizes danger to the fisherman from the barbs while he is attaching the bait and it makes the unobstructed barbs more effective in hooking a fish. Due to and depending upon the original spaced formation between bar-clamp 9 and shank 3 there will not be undue pressure exerted upon the bait and it will not be cut in two.

As gathered from the description and the drawing it is to be noted that my invention includes a number of outstanding advantages: the device effectively holds the bait with a minimum of physical harm; it is simplified in construction; it is simple in operation; it provides a maximum of protection against the hazard of the fisherman hooking himself while attaching the bait; it holds the bait in such manner as to not obstruct the curved-barbed ends of the fishhook or hooks.

I claim as my invention:

1. In combination: a fishhook comprising an eye at its upper end for attaching a fish line, a straight shank portion and a curved extending outwardly therefrom and terminating in a barb; and a bait-holding attachment affixed to the fishhook, said bait-holding attachment having a pressure exerting upper section extending outwardly from said fishhook in its upper portion and having a lower bar-clamp portion positioned substantially parallel to the straight shank portion of said fishhook and terminating at its bottom end in a curved portion which substantially follows the curvature of the fishhook curved portion, said pressure exerting upper section and said lower bar-clamp portion being interconnected by an intermediate wire section extending across and generally at right angles to said straight shank portion.

2. The combination of claim 1 wherein the substantially parallel portion of the bait-holding attachment is positioned on a different side of the straight shank of the fishhook from the direction the curved portion of said fishhook extends outwardly.

3. The combination of claim 1 wherein said bait-holding attachment is formed of a more resilient material than the material of the fishhook itself.

4. The combination of claim 3 wherein the surface of the resilient material of the bait-holding attachment is serrated in nature at least on the side facing the fishhook.

References Cited

UNITED STATES PATENTS

| | | | |
|---|---|---|---|
| 1,150,386 | 8/1915 | Rife | 43—44.8 |
| 2,775,058 | 12/1956 | Roberts | 43—44.8 X |
| 2,962,833 | 12/1960 | Stinson | 43—44.8 X |
| 3,047,977 | 8/1962 | Der-Hagopian | 43—44.8 |
| 3,000,131 | 9/1961 | Stinson | 43—44.8 X |

FOREIGN PATENTS

| | | |
|---|---|---|
| 490,356 | 2/1953 | Canada. |

SAMUEL KOREN, *Primary Examiner.*

J. H. CZERWONKY, *Assistant Examiner.*